United States Patent [19]

Mihara et al.

[11] Patent Number: 4,504,218
[45] Date of Patent: Mar. 12, 1985

[54] CERAMIC BURNER PLATE

[75] Inventors: Toshihiro Mihara, Hirakata; Takao Kusuda, Ashiya; Koichi Noma; Hiromitsu Taki, both of Miyazaki, all of Japan

[73] Assignee: Matsushita Electric Industrial Co., Ltd., Japan

[21] Appl. No.: 433,137

[22] PCT Filed: Jan. 28, 1982

[86] PCT No.: PCT/JP82/00027
§ 371 Date: Sep. 28, 1982
§ 102(e) Date: Sep. 28, 1982

[87] PCT Pub. No.: WO82/04484
PCT Pub. Date: Dec. 23, 1982

[30] Foreign Application Priority Data

| Feb. 3, 1981 [JP] | Japan | 56-14826 |
| Feb. 3, 1981 [JP] | Japan | 56-14827 |
| Feb. 3, 1981 [JP] | Japan | 56-14830 |
| Feb. 3, 1981 [JP] | Japan | 56-14831 |
| Feb. 3, 1981 [JP] | Japan | 56-14833 |
| Feb. 3, 1981 [JP] | Japan | 56-14834 |
| Feb. 3, 1981 [JP] | Japan | 56-14835 |

[51] Int. Cl.³ .......................... F23D 13/12
[52] U.S. Cl. ..................... 431/326; 431/328
[58] Field of Search ............. 431/328, 326, 7, 147, 431/170, 329; 126/92 A, 92 R, 92 AC; 264/56

[56] References Cited

U.S. PATENT DOCUMENTS

| 3,170,504 | 2/1965 | Lanning | 431/328 |
| 3,251,396 | 5/1966 | Nitsche | 431/328 |
| 3,291,188 | 12/1966 | Partiot | 431/328 |
| 3,954,387 | 5/1976 | Cooper | 431/329 |

FOREIGN PATENT DOCUMENTS

| 50036 | 4/1977 | Japan | 431/328 |
| 153343 | 12/1979 | Japan | 431/328 |
| 25773 | 2/1980 | Japan | 431/328 |
| 1117428 | 6/1968 | United Kingdom | 431/328 |
| 1264241 | 2/1972 | United Kingdom | 431/328 |

Primary Examiner—Samuel Scott
Assistant Examiner—Helen Ann Odar
Attorney, Agent, or Firm—Wenderoth, Lind & Ponack

[57] ABSTRACT

This invention relates to a ceramic burner plate using a fiber composite ceramic (1) of low thermal conductivity having gas passages (3), and provides a burner plate, wherein the burner plate contains a lithium component and such components as nickel, manganese, cobalt, titanium, copper, iron, chromium, and vanadium, to assist in the combustion of gas, and has a surface construction (2) having triangular projections, hexagonal projections or rhombic projections, to ensure increased heat radiation.

6 Claims, 14 Drawing Figures

FIG.1 — A
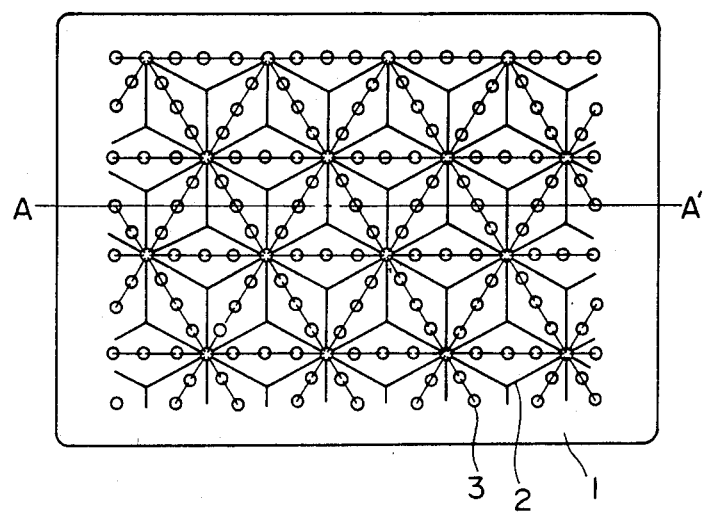
FIG.1 — B
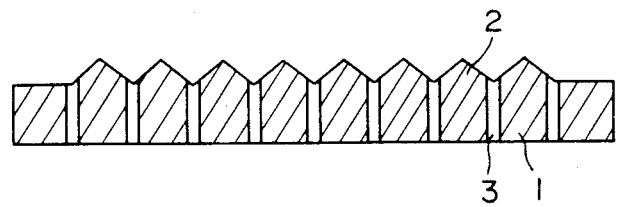

FIG.2-A
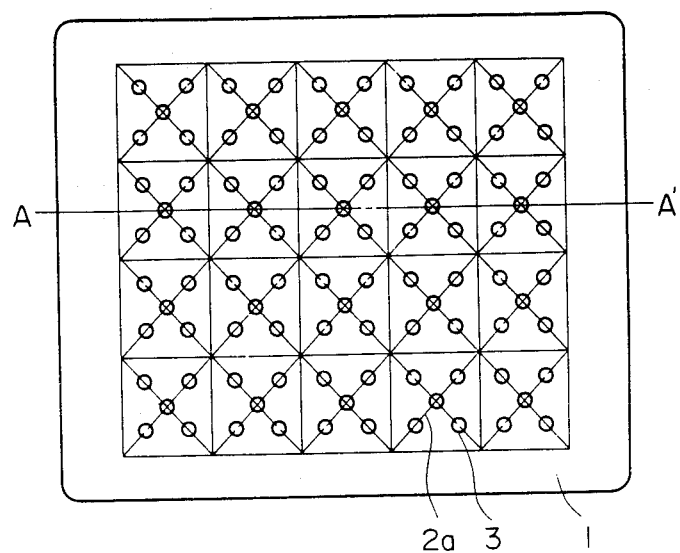
2a 3 1
FIG.2-B
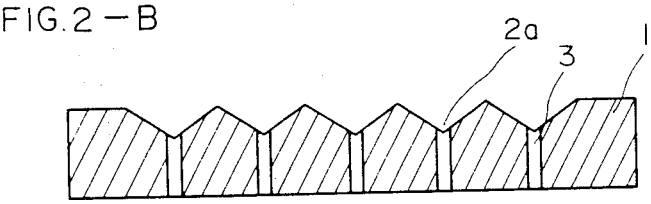
2a 3 1

FIG.3-A
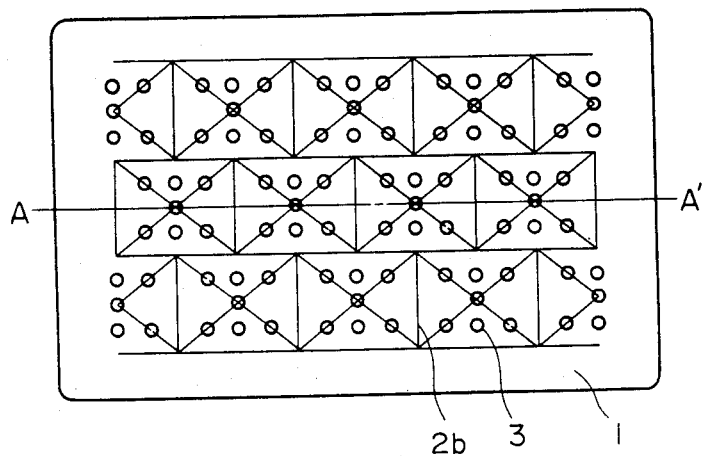
FIG.3-B
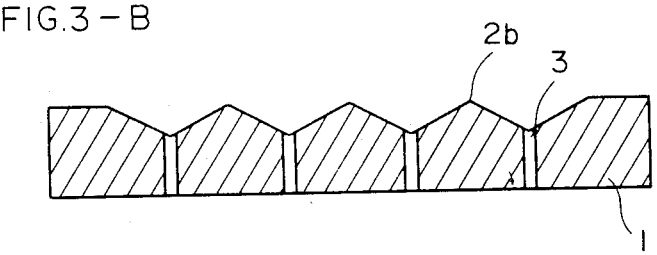

FIG.4-A
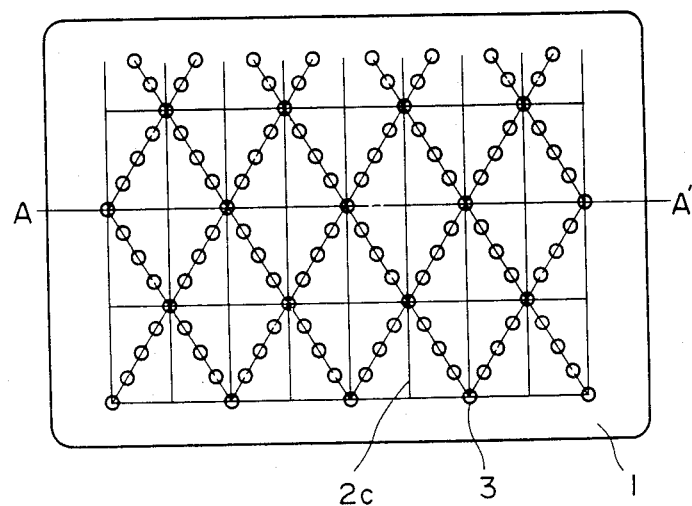
2c  3  1
FIG.4-B
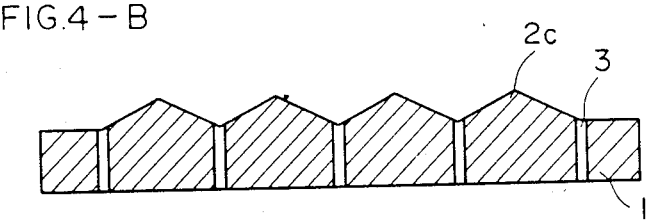
2c  3  1

FIG.5-A
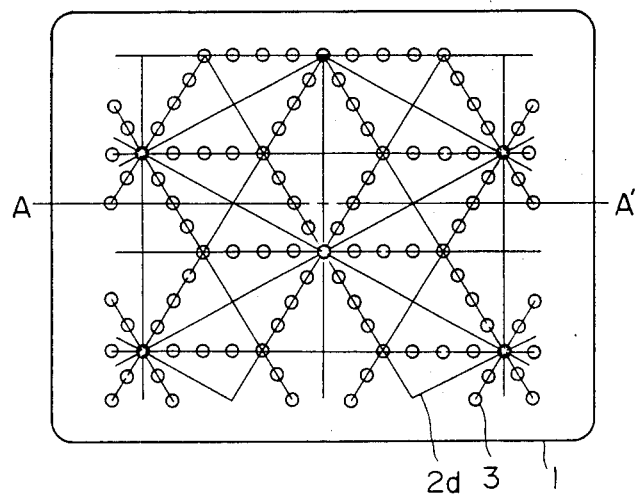
FIG.5-B
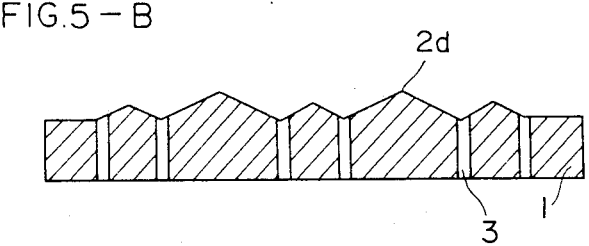

FIG.6-A
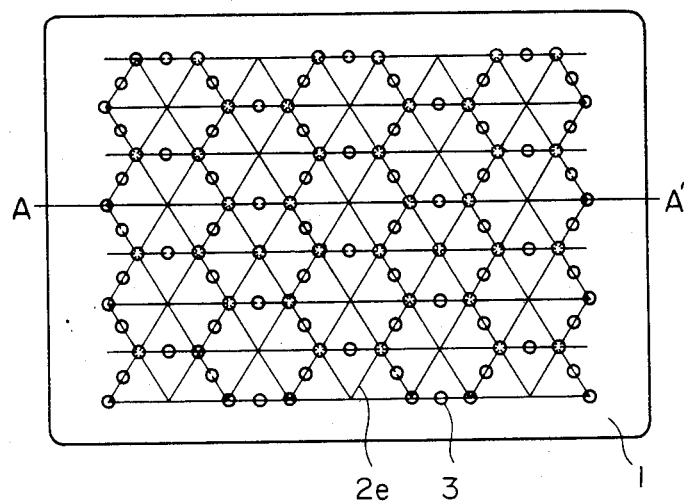
FIG.6-B
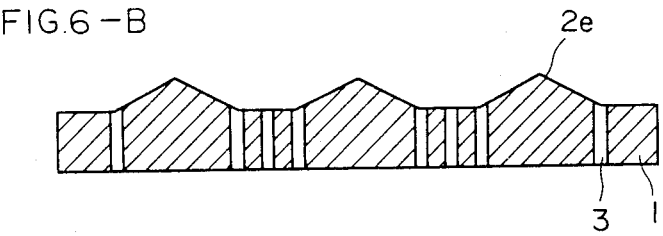

FIG.7-A
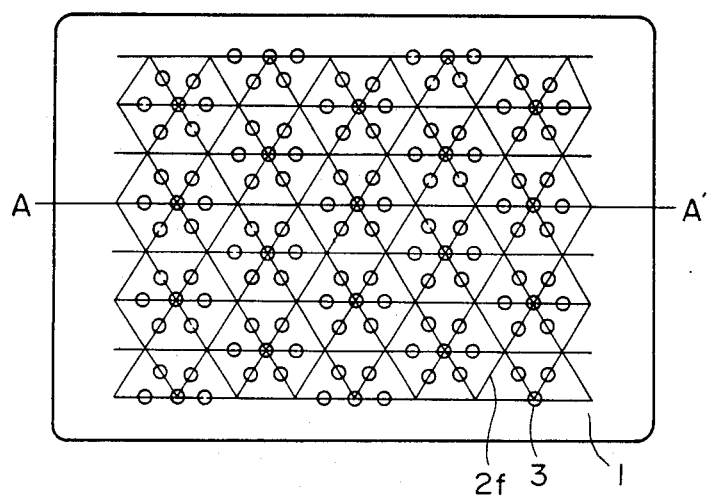
FIG.7-B
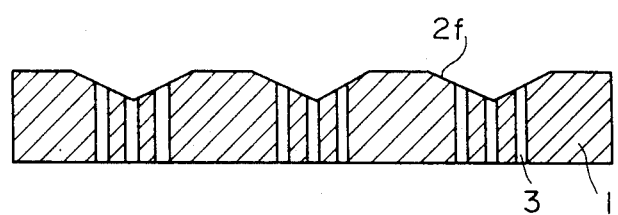

4,504,218

CERAMIC BURNER PLATE

TECHNICAL FIELD

This invention relates to a ceramic burner plate adapted to provide increased heat radiation and improved gas combustion, wherein such ceramic fibers as alumina fibers and alumina-silica fibers, a lithium component and such components as nickel, manganese, cobalt, titanium, copper, iron, chromium and vanadium are added to fireclay to prepare a composite ceramic material, which is then shaped into a platelike form, said burner plate being designed so that its surface is effectively red-heated by the combustion of gas which jets through gas passages extending from the back to the surface of the plate.

BACKGROUND ART

Among the known radiation type burners are the metallic burner using a wire net adapted to be red-heated by the combustion of gas taking place over its surface, and the ceramic burner in the form of a ceramic plate formed with gas passages. In the case of the metallic burner, from the standpoint of the corrosion resistance of metals at high temperature, it is difficult to increase the combustion surface temperature to provide increased heat radiation. On the other hand, the ceramic burner plate, the material of which is highly resistant to heat, is capable of having its surface heated to a relatively high temperature, but if its surface is heated to 900° C. or above, the back-surface temperature would also become high as to cause a backfire. Raising the burner plate surface temperature is also undesirable in that the thermal shock due to the ignition and flame-out of the burner increases so much as to cause cracking, the cracked portion, in turn, tending to cause backfire, which shortens the life of the plate. To remedy such drawbacks, attempts have heretofore been made to use ceramic cloth for the combustion surface or use porous ceramics as a plate material of low thermal conductivity for the burner portion. Another attempt has been to irregularly deform the combustion surface to obtain a burner plate having a larger surface area, but it has a drawback that the deformation of the combustion surface results in dark portions representing poor combustion of gas, increasing the $CO/CO_2$ ratio of exhaust gases.

DISCLOSURE OF THE INVENTION

This invention provides a burner plate made of composite ceramics in the form of fireclay having added thereto such ceramic fibers as alumina fiber and alumina-silica fiber, a lithium component and such components as nickel, manganese, cobalt, titanium, copper, iron, chromium, and vanadium, said ceramics being shaped into a platelike form having on its surface an undulating pattern depicting continuous triangles, hexagons, rhombuses or the like, so as to increase heat radiation and minimize the CO content of exhaust gases.

Embodiments of the invention will now be described with reference to the drawings.

BRIEF DESCRIPTION OF THE DRAWINGS

FIG. 1A is a plan view of a ceramic burner plate according to an embodiment of the invention;

FIG. 1B is a section view along the line A—A' of FIG. 1A and

FIGS. 2A, B, 3A, B, 4A, B, 5A, B, 6A, B and 7A, B are plan views and sections along the line A—A' showing ceramic burner plates according to other embodiments of the invention.

BEST MODE FOR CARRYING OUT THE INVENTION

A burner plate according to the invention has a thermal conductivity of as low as 0.1 Kcal/m·h·°C. or less, is capable of maintaining the surface temperature above 900° C. without causing backfire, and provides increased heat radiation from its surface construction having triangular, hexagonal, rhombic or otherwise shaped projections. According to the invention, coarse powder of petalite, spondumene or the like containing lithium oxide, lithium carbonate or other lithium component is added to fireclay powder followed by the addition of powder of an oxide, carbonate or the like containing such components as nickel, manganese, cobalt, titanium, copper, iron, chromium and vanadium and the addition of ceramic fiber cut into 0.1 to 10 mm lengths, in an amount of 40 to 96 wt.% based on the total weight, while being mixed in the aqueous slurry. A solution of starch is then added to the mixture to cause the particles to aggregate in the state where they are mixed with the ceramic fiber, thus forming a secondary structure retaining the mixed state of the clay particles, ceramic fiber and other components. The mixture is then poured in to a mold having a surface pattern reverse to a continuous triangular, hexagonal, rhombic or otherwise figured projection pattern, and pins corresponding to gas passages, to provide a uniform composite molding. The latter is then dried and fired to produce a burner plate of increased heat radiation in the form of a composite ceramic structure containing ceramic fiber. With such burner plate, the CO content of exhaust gases during combustion of gas has been found to be smaller. The clay used in the composite ceramics contained fireclay as the principal component, and sericite clay, and was fired in air at 900° C.–1300° C., whereby well-sintered composite ceramics was obtained. In the process for molding the burner plate, if the particle size is adjusted so that clay contains about 10% coarse particles above 75 μm, this improves filtration and facilitates the molding of a plate having a desired thickness. Ground powders of petalite, spondumene, etc., containing lithium may be used as coarse particle powders. It has been found that the lithium component, when contained in the form of the oxide ($Li_2O$) in an amount of 0.1 to 5 wt.% in the composite ceramics, decreased the CO content of exhaust gases when a gas was burned over the combustion surface. If the amount of lithium is less than 0.1 wt.%, its effect is low, while if it is above 5 wt.%, it spoils the sinterability of the clay component, decreasing the strength of the ceramic burner plate. It has been found that if the composite ceramics contained, besides the lithium component, such components as nickel, manganese, cobalt, titanium, copper, iron, chromium, and vanadium in oxide form, this further accelerated the combustion of gas catalytically. If nickel, manganese, cobalt, titanium, copper, iron, chromium, and vanadium as components contained in the composite ceramics in combination with the lithium component are less than 0.1 wt.% of the composite ceramics, the combustion catalyzing effect in synergism with lithium is weak, while if they are above 5 wt.%, the relative decrease in the amount of clay component degrades the aggregation of powder during molding, making it difficult to obtain uniform composite ceramics.

The ceramic fiber contained in the composite ceramics is desirably of alumina or alumina-silica composition, it being noted that rock wool and glass fiber cannot be used since they cannot endure temperatures above 900° C. It is desirable that the amount of ceramic fiber to be incorporated in fireclay be in range from 40 to 96 wt.% based on the total amount of the composite ceramics. If the amount of ceramic fiber is less than 40 wt.%, the resulting burner plate will be characterized by high strength and high heat conductivity, while if it exceeds 96 wt.%, the strength of burner plate will be below 1 Kg/cm². The mixed slurry containing clay particles and other components, and the ceramic fiber of said composition is vacuum drained and molded in a burner plate mold and dried at 200° C., whereupon it is fired in air at 900° C.-1300° C. to provide a ceramic structure. If the firing temperature is below 900° C., the sintering of clay will be insufficient and the strength of burner plate will be below 1 Kg/cm² while deformation of the burner plate will take place owing to shrinkage at high temperatures during use; thus, this is undesirable. On the other hand, if it is above 1300° C., the ceramic fiber will tend to loss shape; thus, this is also undesirable.

The surface of a burner plate in the form of composite ceramics has a construction presenting various projections and recesses which are continuous with each other, as shown in FIGS. 1-7, the length of one side being about 5 to 20 mm. The gas passages extending through the back surface may be formed independently of the surface construction having the undulating pattern, but in order to retain the undulating pattern, they may be formed in the recesses or valleys, or in the slopes, as shown in FIGS. 1-7.

The ceramic burner plate according to the invention will now be described with reference to embodiments thereof.

As shown in FIGS. 1A and B, the surface of a composite ceramic structure 1 is continuously formed with triangular projections 2, and each valley defined between adjacent projections 2 is formed with a plurality of gas passage 3.

FIGS. 2A and B show another embodiment of the invention, wherein the surface of a composite ceramic structure 1 is continuously formed with square recesses 2a, each being formed with a plurality of gas passages 3.

FIGS. 3A and B show a further embodiment of the invention, wherein the surface of a composite ceramic structure 1 is formed with rectangular recesses 2b and with a plurality of gas passages 3.

FIGS. 4A and B show another embodiment of the invention, wherein the surface of a composite ceramic structure 1 is formed with rhombic projections 2c which are regularly continuous with each other through four external angles, and a plurality of gas passages 3 are formed on each bottom edge of each rhombus.

FIGS. 5A and B show another embodiment of the invention, wherein the surface of a ceramic structure 1 is formed with rhombic projections 2d which are continuous with each other alternately through three external angles and six external angles, and each valley between adjacent projections is formed with a plurality of gas passages 3.

FIGS. 6A and B show another embodiment of the invention, wherein the surface of a ceramic structure 1 is continuously formed with hexagonal projections 2e and each valley between adjacent projections 2e is formed with a plurality of gas passages 3.

FIGS. 7A and B show another embodiment of the invention, wherein the surface of a ceramic structure 1 is formed with continuous hexagonal honeycomb-like recesses 25 each formed with a plurality of gas passages 3.

EXAMPLE 1

35 g of ceramic fiber of alumina-silica composition was cut into 0.1-10 mm lengths, which were then dispersed in 3 l of water together with small amounts of surfactant, to prepare 8 separate volumes of dispersion. On the other hand, to 10 g of fireclay mixed with 2.5 g of sericite clay were added 0 g, 0.06 g, 0.12 g, 0.6 g, 1.2 g, 3.7 g, 6.2 g and 6.8 g of lithium carbonate ($Li_2CO_3$), respectively, to prepare 8 kinds of mixed powder, to each of which was added 500 ml of water while stirring to provide a suspension. These dispersions of ceramic fiber were separately added to the suspensions of clay and lithium carbonate while gently stirring for mixing. These preparations were each put in 10 l of water to provide 8 kinds of slurry, each being then charged into a 72×100 mm² metal mold for vacuum draining and molding to provide a molding having a thickness of about 25 mm. The bottom of the metal mold had a surface construction having continuous concave regular triangles 10 mm long in each side and 4 mm deep and had 12 mm diameter pins vertically movable and arranged on lines corresponding to the bottoms of the triangles as shown in FIG. 1. Upon vacuum draining and molding, said pins were removed from the metal mold and the molding was dried at 150° C. for 5 hours. It was then heated in air at 1250° C. for 1.5 hours and subsequently quenched. The resulting burner plates were in the form of composite ceramics containing 0 wt.%, 0.05 wt.%, 0.1 wt.%, 0.5 wt.%, 1 wt.%, 3 wt.%, 5 wt.%, and 5.5 wt.% lithium oxide ($Li_2O$) as the lithium component and having continuous triangular projections. The results of measurements of the bulk density and thermal conductivity of the resulting burner plates are shown in Table 1. These ceramic burner plates containing different amounts of lithium component were attached through a ceramic wool cushion to a burner frame attached to a venturi and a city gas having a gauge pressure of 70 mm-$H_2O$ was emitted through a nozzle and burned over the surface of the burner plate, it being found that even when the surface having the triangular projections was heated to about 950° C., there occurred no backfire, producing a large amount of heat radiation due to the high temperature and to the increase in the area of the combustion surface provided by the triangular projections. The $CO/CO_2$ ratio in the exhaust gases was measured, and the results, together with the strength of burner plate, are shown in Table 1.

TABLE 1

| | Burner Plate Characteristics | | | |
|---|---|---|---|---|
| No. | $Li_2O$ content (wt. %) | Bulk density (g/cm³) | Thermal conductivity (Kcal/m · h · °C.) | $CO/CO_2$ | Bending strength (kg/cm²) |
| 1 | 0 | 0.34 | 0.07 | 0.05 | 5 |
| 2 | 0.05 | 0.33 | 0.07 | 0.05 | 5 |
| 3 | 0.1 | 0.30 | 0.06 | 0.01 | 4 |
| 4 | 0.5 | 0.30 | 0.06 | 0.01 | 3 |
| 5 | 1 | 0.31 | 0.06 | 0.009 | 3 |
| 6 | 3 | 0.30 | 0.06 | 0.006 | |

TABLE 1-continued

| | Burner Plate Characteristics | | | | |
|---|---|---|---|---|---|
| No. | $Li_2O$ content (wt. %) | Bulk density (g/cm³) | Thermal conductivity (Kcal/m · h · °C.) | CO/$CO_2$ | Bending strength (kg/cm²) |
| 7 | 5 | 0.27 | 0.05 | 0.006 | 6 |
| 8 | 5.5 | 0.25 | 0.05 | 0.008 | 2 |

As can be seen in Table 1, if the amount of $Li_2O$ as the lithium component is above 0.1 wt.%, the CO/$CO_2$ ratio in the exhaust gases decreases. Further, since these burner plates are low in bulk density, they can be lightly attached to the burner frame.

EXAMPLE 2

To 11 g of fireclay mixed with sericite clay were added lithium carbonate ($Li_2CO_3$) and powdered NiO, $MnCO_3$, CoO, $TiO_2$, CuO, $Fe_2O_3$, $Cr_2O_3$, and $V_2O_5$, as metal oxides in various amounts, as shown in Table 2, and each preparation was dispersed in 500 ml of water. On the other hand, 35 g of ceramic fiber of alumina-silica composition was cut into 0.1–10 mm lengths by a cutter and they were dispersed in 3 l of water together with small amounts of surfactant to prepare separate volumes of dispersion. These were separately put in suspensions of powder while gently stirring for mixing. These suspensions were each added to 10 l of water for dilution so as to prepare slurries, which were then vacuum drained and molded in the same manner as in Example 1, whereupon the moldings were fired in air at 1200° C. for 2 hours. The resulting burner plates had continuous rhombic projections as shown in FIG. 4, their bulk density being shown in Table 2.

The burner plates thus obtained were attached to a burner frame as in Example 1 and a city gas having a gauge pressure of 70 mm-$H_2O$ was burned over the plate surface, the CO/$CO_2$ ratio of the exhaust gases being measured. The results, together with the strength of burner plate, are shown in Table 2. As can be seen in Table 2, the burner plate containing the lithium component and one or more components selected from the class consisting of nickel, manganese, cobalt, titanium, copper, iron, chromium, and vanadium provide decreased CO/$CO_2$ ratios in exhaust gases produced by combustion of gas and ensure satisfactory combustion of gas.

TABLE 2

| | | | Burner Plate Characteristics | | | |
|---|---|---|---|---|---|---|
| No. | Added oxide | Amount (wt. %) | Bulk density (g/cm³) | Thermal conductivity (Kcal/m · h · °C.) | CO/$CO_2$ | Bending strength (Kg/cm²) |
| 1 | NiO | 1 | 0.33 | 0.07 | 0.06 | 15 |
| 2 | $Li_2O$ NiO | 0.01 1 | 0.33 | 0.07 | 0.05 | 15 |
| 3 | $Li_2O$ NiO | 1 0.05 | 0.30 | 0.06 | 0.005 | 11 |
| 4 | $Li_2O$ NiO | 1 0.1 | 0.34 | 0.07 | 0.002 | 14 |
| 5 | $Li_2O$ NiO | 1 0.5 | 0.31 | 0.06 | 0.001 | 11 |
| 6 | $Li_2O$ NiO | 1 1 | 0.30 | 0.06 | 0.001 | 9 |
| 7 | $Li_2O$ NiO | 1 3 | 0.31 | 0.06 | 0.002 | 12 |
| 8 | $Li_2O$ NiO | 1 5 | 0.27 | 0.05 | 0.002 | 7 |
| 9 | $Li_2O$ NiO | 1 5.5 | 0.25 | 0.05 | 0.004 | 3 |

TABLE 2-continued

| | | | Burner Plate Characteristics | | | |
|---|---|---|---|---|---|---|
| No. | Added oxide | Amount (wt. %) | Bulk density (g/cm³) | Thermal conductivity (Kcal/m · h · °C.) | CO/$CO_2$ | Bending strength (Kg/cm²) |
| 10 | $Li_2O$ $MnO_2$ | 1 0.5 | 0.33 | 0.07 | 0.001 | 11 |
| 11 | $Li_2O$ CoO | 1 0.5 | 0.34 | 0.07 | 0.004 | 10 |
| 12 | $Li_2O$ $TiO_2$ | 1 0.5 | 0.30 | 0.06 | 0.003 | 10 |
| 13 | $Li_2O$ CuO | 1 0.5 | 0.36 | 0.07 | 0.001 | 14 |
| 14 | $Li_2O$ $Fe_2O_3$ | 1 0.5 | 0.35 | 0.07 | 0.0009 | 14 |
| 15 | $Li_2O$ $Cr_2O_3$ | 1 0.5 | 0.32 | 0.06 | 0.004 | 10 |
| 16 | $Li_2O$ $V_2O_5$ | 1 0.5 | 0.36 | 0.07 | 0.003 | 16 |
| 17 | $Li_2O$ $MnO_2$ $Fe_2O$ $Fe_2O_3$ | 1 0.5 0.5 | 0.33 | 0.07 | 0.0009 | 13 |
| 18 | $Li_2O$ $MnO_2$ $V_2O_5$ | 1 1 0.5 | 0.33 | 0.07 | 0.0009 | 11 |
| 19 | $Li_2O$ NiO CuO | 1 1 0.5 | 0.31 | 0.06 | 0.001 | 9 |
| 20 | $Li_2O$ $Cr_2O_3$ $TiO_2$ CoO | 1 0.5 0.5 0.5 | 0.33 | 0.07 | 0.002 | 13 |
| 21 | $Li_2O$ $Fe_2O_3$ $Cr_2O_3$ $V_2O_5$ | 1 0.4 0.4 0.4 | 0.34 | 0.07 | 0.0007 | 10 |

EXAMPLE 3

19 g, 17 g, 12 g, 6 g, 3 g, 1 g, and 0.9 g of fireclay mixed with sericite clay were weighed out and mixed with 13 g, 12 g, 8 g, 4 g, 2 g, 1 g, and 0.6 g of petalite powder having a particle size of 100 μm and containing lithium as a component. These 7 kinds of mixed powder were each dispersed in 500 ml of water. On the other hand, 17 g, 20 g, 29 g, 39 g, 44 g, 47 g and 48 g of ceramic fiber of alumina-silica composition were weighed out and were cut by a cutter into 0.1–10 mm lengths, which, together with small amounts of surfactant, were dispersed in 3 l of water. The clay mixture suspensions were separately mixed with the ceramic fiber dispersions while gently stirring. These mixed slurries contained 35 wt.%, 41 wt.%, 59 wt.%, 80 wt.%, 90 wt.%, 96 wt.%, and 97 wt.% ceramic fiber as a solid component. They were then each put in 10 l of water to provide diluted slurries, which were then vacuum drained, molded and dried in the same manner as in Example 1 and fired in air at 1300° C. for 15 hours. The resulting burner plates contained lithium and had continuous hexagonal projections, as shown in FIG. 6, on their surfaces. The bulk density and thermal conductivity of these burner plates are shown in Table 3. The ceramic burner plates containing the respective amounts of ceramic fiber were attached to a burner frame similar to the one used in Example 1, and a city gas having a gauge pressure of 70 mm-$H_2O$ was burned over the plate face and the CO/$CO_2$ ratio in the exhaust gases was measured. The results together with the burner plate strength are shown in Table 3. As can be seen in Table 3, when the amount of fiber is above 40 wt.%, the thermal conductivity is below 0.1 Kcal/m·h·°C. and when it exceeds 96 wt.%, the strength of burner plate is below 1 Kg/cm².

TABLE 3

| | Amount of fiber | | Burner Plate Characteristics | | | |
|---|---|---|---|---|---|---|
| | | | Bulk density | Thermal conductivity | | Bending strength |
| No. | (g) | (wt. %) | (g/cm³) | (Kcal/m · h · °C.) | CO/CO₂ | (Kg/cm²) |
| 1 | 17 | 35 | 0.85 | 0.14 | 0.008 | 45 |
| 2 | 20 | 41 | 0.65 | 0.09 | 0.006 | 41 |
| 3 | 29 | 59 | 0.32 | 0.06 | 0.005 | 24 |
| 4 | 39 | 80 | 0.28 | 0.05 | 0.005 | 10 |
| 5 | 44 | 90 | 0.17 | 0.04 | 0.006 | 7 |
| 6 | 47 | 96 | 0.13 | 0.03 | 0.006 | 2 |
| 7 | 47.5 | 97 | 0.11 | 0.03 | 0.006 | 0.7 |

INDUSTRIAL APPLICABILITY

As has been described so far, the burner plate according to the invention is in the form of composite ceramic comprising ceramic fiber and fireclay containing such components as lithium, nickel, manganese, cobalt, titanium, copper, iron, chromium, and vanadium, the surface of the burner plate having an undulating pattern, such as continuous triangular projections, hexagonal projections, rhombic projections or square recesses. The burner plate has high heat radiating and improved gas burning characteristics and is easy to attach to the burner frame and has a prolonged life.

We claim:

1. A ceramic burner plate comprising a composite ceramic structure of fireclay and ceramic fiber, said ceramic burner plate having a lithium component as a metal oxide for reduction of carbon monoxide in exhaust gases from the burner plate, at 0.1 wt. % to 5 wt. % based on the total weight of the composite ceramic, and at least one component as a metal oxide, at 0.1 wt % to 5 wt. % based on the total weight of the composite ceramic, selected from the group consisting of nickel, manganese, cobalt, titanium, copper, iron, chromium, and vanadium, and said burner plate having a continuous undulating pattern on its surface.

2. A ceramic burner plate as set forth in claim 1, wherein the plate surface is formed with continuous triangular projections.

3. A ceramic burner plate as set forth in claim 1, wherein the plate surface is formed with continuous square recesses.

4. A ceramic burner plate as set forth in claim 1, wherein the plate surface is formed with continuous rhombic projections.

5. A ceramic burner plate as set forth in claim 1, wherein the plate surface is formed with continuous hexagonal projections.

6. A ceramic burner plate as set forth in claim 1, wherein the plate surface is formed with continuous hexagonal recesses.

* * * * *